(12) United States Patent
Wadman et al.

(10) Patent No.: US 10,105,660 B2
(45) Date of Patent: Oct. 23, 2018

(54) DIFFUSER MEMBRANE AND METHOD OF MANUFACTURE

(71) Applicant: Environmental Dynamics International, Inc., Columbia, MO (US)

(72) Inventors: Warrick S. Wadman, Columbia, MO (US); David A. Capron, Columbia, MO (US); Charles E. Tharp, Columbia, MO (US)

(73) Assignee: Environmental Dynamics International, Inc., Columbia, MO (US)

( * ) Notice: Subject to any disclaimer, the term of this patent is extended or adjusted under 35 U.S.C. 154(b) by 0 days.

(21) Appl. No.: 15/586,919

(22) Filed: May 4, 2017

(65) Prior Publication Data

US 2017/0296987 A1 Oct. 19, 2017

Related U.S. Application Data

(62) Division of application No. 13/491,718, filed on Jun. 8, 2012, now Pat. No. 9,795,933.

(Continued)

(51) Int. Cl.
*B01F 3/00* (2006.01)
*B01F 3/04* (2006.01)
(Continued)

(52) U.S. Cl.
CPC ...... *B01F 3/04269* (2013.01); *B29C 47/0004* (2013.01); *B29C 47/0019* (2013.01);
(Continued)

(58) Field of Classification Search
CPC ............ B29C 47/0019; B29C 47/0004; B29C 47/0023; B29C 47/021; B29C 47/065; B29C 47/26; B29C 47/56; B01D 3/04; B01D 3/04269; B29K 2995/0065; B29K 2007/00; B01F 2003/04312; B01F 2003/04319; B01F 2003/04368; C02F 3/20
(Continued)

(56) References Cited

U.S. PATENT DOCUMENTS 4,687,430 A    8/1987  Morris et al.
4,908,251 A *  3/1990  Iimura ................... B01D 69/10
                                                            428/136

(Continued)

*Primary Examiner* — T. Bennett McKenzie
(74) *Attorney, Agent, or Firm* — Husch Blackwell LLP

(57) ABSTRACT

A diffuser membrane and a method for manufacturing the same are provided. In the method for manufacturing, a first material is heated and extruded to form a base layer and a second material is heated and extruded to form a coating layer. The base layer and coating layer may be extruded substantially simultaneously in a coextrusion process. Accordingly, the coating may be applied to the base layer in a manner that optimizes the bonding between the two layers and provides the ability to control the thickness of the coating layer. Alternatively, the base layer is formed initially and the coating layer is subsequently formed thereover. The first and second materials have differing properties. The first material may comprise polyurethane and the second material may comprise polyurethane and PTFE.

13 Claims, 5 Drawing Sheets

Related U.S. Application Data

(60) Provisional application No. 61/495,830, filed on Jun. 10, 2011.

(51) Int. Cl.

| | | |
|---|---|---|
| *B29C 47/00* | (2006.01) | |
| *B29C 47/02* | (2006.01) | |
| *B29C 47/06* | (2006.01) | |
| *B29C 47/56* | (2006.01) | |
| *B29K 7/00* | (2006.01) | |
| *B29C 47/26* | (2006.01) | |

(52) U.S. Cl.
CPC ........ *B29C 47/0023* (2013.01); *B29C 47/021* (2013.01); *B29C 47/065* (2013.01); *B01F 2003/04312* (2013.01); *B01F 2003/04319* (2013.01); *B01F 2003/04368* (2013.01); *B29C 47/26* (2013.01); *B29C 47/56* (2013.01); *B29K 2007/00* (2013.01); *B29K 2995/0065* (2013.01)

(58) Field of Classification Search
USPC ............. 261/122.1; 264/145, 173.16, 173.19
See application file for complete search history.

(56) References Cited

U.S. PATENT DOCUMENTS

| | | | |
|---|---|---|---|
| 6,759,129 | B2 | 7/2004 | Fukushi |
| 7,044,453 | B2 | 5/2006 | Tharp |
| 7,396,499 | B2 | 7/2008 | Frankel et al. |
| 7,674,514 | B2 | 3/2010 | Frankel et al. |
| 7,815,974 | B2 | 10/2010 | Tharp |
| 2004/0154978 | A1 | 8/2004 | Sale et al. |
| 2005/0003151 | A1* | 1/2005 | Jacoby .................... B29C 55/14 428/131 |
| 2007/0001323 | A1 | 1/2007 | Kang |
| 2007/0039274 | A1 | 2/2007 | Harrington, Jr. et al. |
| 2008/0003405 | A1 | 1/2008 | Tharp |
| 2008/0014410 | A1* | 1/2008 | Johnston ................ B29C 33/62 428/141 |
| 2008/0251453 | A1 | 10/2008 | Weissman |
| 2009/0024204 | A1* | 1/2009 | Greenhalgh ........ A61B 17/7098 623/1.15 |
| 2010/0032851 | A1 | 2/2010 | Frankel et al. |
| 2010/0055276 | A1 | 3/2010 | Chen |
| 2011/0027528 | A1 | 2/2011 | Tharp et al. |
| 2011/0297612 | A1* | 12/2011 | Hester .................. B01D 67/002 210/500.21 |

\* cited by examiner

DIFFUSER MEMBRANE AND METHOD OF MANUFACTURE

CROSS-REFERENCE TO RELATED APPLICATIONS

This Application is a Divisional of and claims priority to U.S. patent application Ser. No. 13/491,718 filed Jun. 8, 2012 to Warrick S. Wadman et al., entitled "Diffuser Membrane and Method of Manufacture," currently pending. This Application further claims the benefit of U.S. Provisional Patent Application Ser. No. 61/495,830 filed Jun. 10, 2011 to Charles E. Tharp entitled "Diffuser Membrane and Method of Manufacture." The entire disclosures, including the specifications and drawings, of all above-referenced applications are incorporated herein by reference.

BACKGROUND OF THE INVENTION

Flexible membrane diffusers have been used in the diffusion of gases into liquids, such as in the aeration of wastewater. The flexible membranes have been used with tubular and disc type diffusers. Examples of each a tubular membrane diffuser and a disc type membrane diffuser are provided in U.S. Pat. No. 7,044,453 to Tharp.

Flexible membrane diffusers are conventionally constructed of rubber or a similar material which is punctured to provide a large number of perforations. It is known that, in the aeration of wastewater, the highest efficiency is achieved when the gas is released as fine bubbles. When gas is applied to the diffuser, the gas pressure expands the membrane away from a diffuser body and causes the perforations to open so that gas discharges through them in the form of fine bubbles. When the gas pressure is relieved, the membrane collapses on the diffuser body to close the perforations and prevent the liquid from entering the diffuser.

Although flexible membrane diffusers are advantageous in many respects and have achieved widespread acceptance in a variety of gas diffusion applications, they are not wholly free of problems. In a wastewater treatment application, materials in the liquid can become deposited on and build up on the membrane to clog or partially clog the perforations and thus reduce the efficiency of the diffuser. For example, fats, greases and other substances which are commonly found in wastewater can adhere to the membrane. Other substances, including calcium and calcium compounds, such as calcium carbonate and calcium sulfate, are especially problematic when they precipitate and build up on the diffuser membrane. Biological growth can also build up and compromise the diffuser efficiency. Diffuser membranes can also be chemically degraded by solvents and various other types of chemicals that may be present in the liquid. This chemical degradation combined with the repeated expansion and contraction of the membrane can weaken the membrane and cause premature structural failure.

One solution to these problems has been to apply a coating to the membrane in order to provide the membrane with a relatively slick surface that resists biological growth and other materials from being deposited thereon. However, the application of the coating is itself not without problems. It is often difficult to establish high bond strengths between the membrane's substrate layer and coating layer, in part, because of the non-adhesive qualities of the coating layer. Various methods have been proposed to address this problem.

One approach is to use an adhesive, bonding or primer layer between the substrate and the coating. By way of example, U.S. Pat. No. 6,759,129 to Fukushi discloses the application of a "bonding" layer between the substrate and coating and U.S. Pat. No. 7,674,514 to Frankel et al. and U.S. Patent Publication No. 2007/0001323 to Kang disclose the application of a "primer" layer between the substrate and coating. Not only does this approach add additional steps, complications and materials in the manufacturing process, but it also results in an increase of the overall product cost.

Another approach is to apply an uncured film to a pre-cured substrate and curing them together in a mold. By way of example, U.S. Pat. No. 7,396,499 to Frankel et al. discloses placing an uncured thin fluoroelastomer film to a pre-cured substrate layer and curing in a high temperature mold. This approach is also disadvantageous in a number of respects. First, because both the substrate and film are in an uncured state, it is not possible to optimize both the curing of the substrate and the bonding of the film to the substrate. The time and temperature requirements for curing differ from those necessary to achieve optimal bonding between the two materials, so either the curing or the bonding must necessarily be compromised. The result is a product that has either an inadequately cured substrate or an inadequate bond between the layers. Second, this approach adds additional steps and complications in the manufacturing process and also results in an increase of the overall product cost. Third, there is no opportunity to clean the substrate because the curing process is interrupted and is only partially completed at the time the film is applied. If contaminants are present, they cannot be removed by solvents or other cleaning processes and can interfere with the bonding to the point of destroying any ability to properly bond the materials together. Fourth, the disclosed fluoroelastomer layer must be applied as a film, thus making it impossible to apply the coating layer in other manners or methods which may be preferable in some cases. For similar reasons, the ability to vary the coating thickness is limited. Finally, this may only be used to produce diffuser membranes that are molded and cannot readily be used to produce diffuser membranes that are extruded.

There are many shortcomings in these existing configurations and the present invention is directed to overcoming one or more, if not all of the above shortcomings.

SUMMARY OF THE INVENTION

The present invention involves the provision of a process for constructing a flexible diffuser membrane for diffusing gas into a liquid. In the process, first and second materials are provided and then heated to their respective, desired extrusion temperatures. In one embodiment, the first material comprises polyurethane and the second material comprises polyurethane and PTFE. The first material is extruded to form a membrane base layer having first and second surfaces. The second material is extruded to form a membrane film or coating layer over the base layer's first surface. The coating has the ability to resist solvents and other chemicals and to resist adhesion of fat, grease, biological growth and other contaminants in the liquid that can damage conventional elastomers and other membrane materials.

In one embodiment, the base layer and coating are extruded substantially simultaneously in a coextrusion process. The two extrusions of the base layer and the coating layer flow out of the extruder die concentrically at the same time and are joined immediately upon exiting the die. In another embodiment, the base layer is formed initially and the coating layer is subsequently formed thereover. In this embodiment, one or more of the base layer's surfaces may be modified, cleaned and/or have a primer, adhesive or adhesive catalyst applied thereto in order to promote adhesion between the base layer and the coating. In yet another embodiment, a layer of primer or adhesive, located between the base layer and coating layer, is extruded over the base layer and may be extruded substantially simultaneously with both the base layer and coating layer.

Upon being formed by the die, the membrane may be cured or cooled depending upon the type of materials used. The membrane may also be perforated to provide a plurality of perforations extending through the membrane, including the base layer and coating, through which a gas can be diffused.

The present invention also involves the provision of a coextruded multi-layered flexible diffuser membrane. The membrane includes an extruded base layer and an extruded coating disposed over the base layer. The base layer may comprise polyurethane and the coating may comprise polyurethane and PTFE. The membrane may be tubular-shaped, disc-shaped, panel-shaped or may be generally flat or of any other shape or curvature suitable for use as a diffuser. In one embodiment, the membrane includes a base layer having a first coating layer disposed on a first surface and a second coating layer disposed on a second surface.

Other and further objects of the invention, together with the features of novelty appurtenant thereto, will appear in the course of the following description.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views.

DETAILED DESCRIPTION OF THE INVENTION

Figure 1:
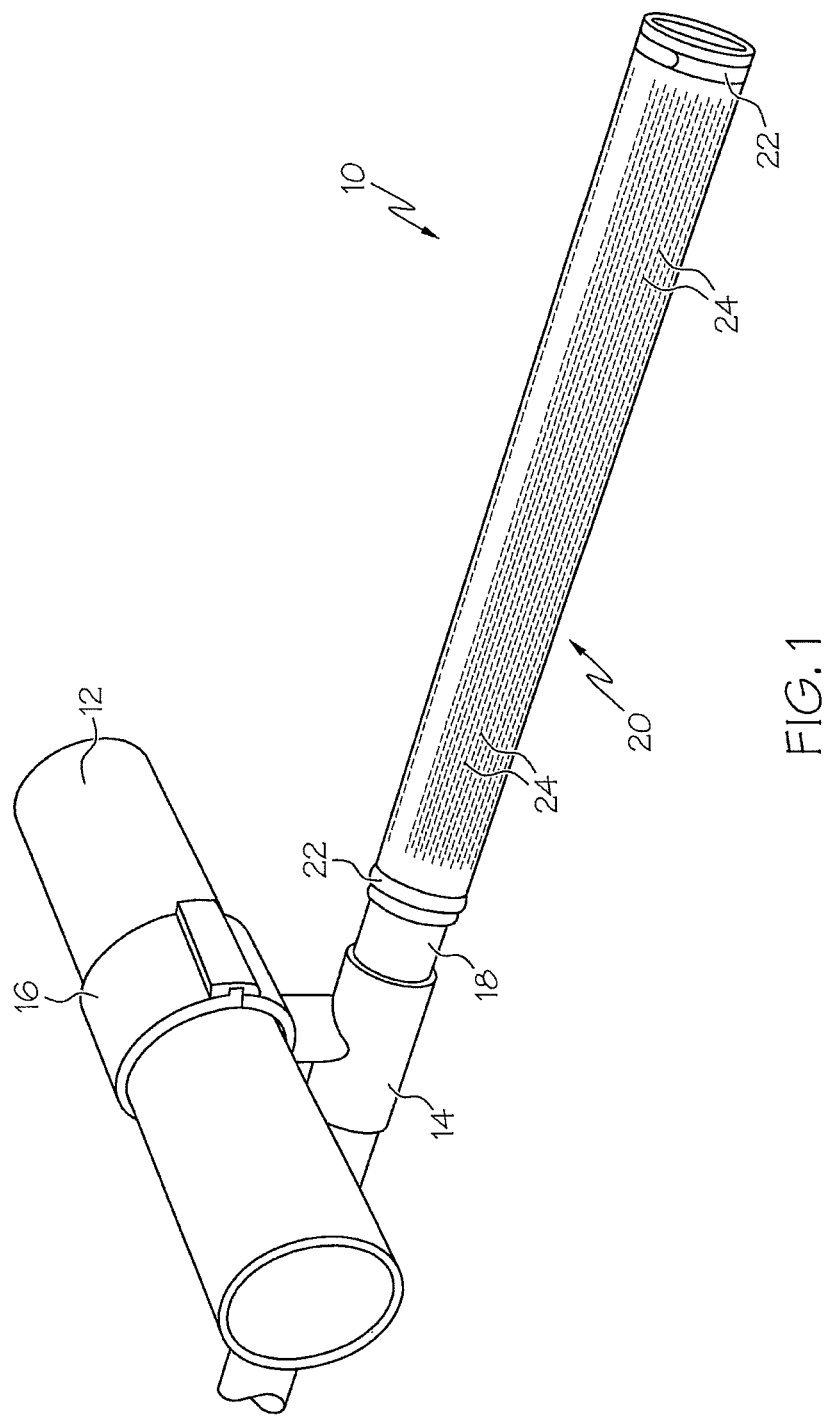
FIG. 1 is a fragmentary perspective view of a portion of an aeration system for aerating wastewater that is equipped with a tubular diffuser having a flexible membrane constructed in accordance with one embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

The present invention is directed to a flexible diffuser membrane and to a process of constructing the membrane. Membranes of this type are used in various applications in which gases are diffused into liquids. One example is a wastewater treatment system in which flexible membrane diffusers are commonly used to diffuse air into the wastewater for aeration and mixing purposes. Flexible membrane diffusers are often used in this type of application on tubular diffusers, disc diffusers and panel diffusers.

While FIG. 1 depicts a tubular membrane diffuser generally identified by numeral 10, it is to be understood that the invention is equally applicable to membranes for disc diffusers, panel diffusers and other types of diffusers that are used both in water and wastewater treatment as well as in the diffusion of various types of gases into other liquids.

The diffuser 10 is used in an aeration system which includes a variety of air lateral pipes such as pipe 12 which may be floating on the surface of the liquid or submerged therein. Air or another gas is supplied to the pipe 12 and is discharged into a tee-fitting 14 connected with a saddle structure 16 used to mount the diffuser assembly on the pipe 12. FIG. 1 depicts tubular diffusers 10 extending from each of the side outlets of the tee-fitting 14 (one shown only fragmentarily), although other arrangements are possible. Diffuser systems and structures different from what is shown in FIG. 1 are within the scope of the invention.

As shown in FIG. 1, the diffuser 10 includes a hollow rigid diffuser body 18 which is connected with an outlet of the tee-fitting 14 and extends generally horizontally. The diffuser body 18 is provided with one or more openings (not shown) which discharge the gas within a flexible membrane 20 secured to the diffuser body 18 by band clamps 22 or other suitable fasteners. The membrane 20 is provided with a plurality of small perforations 24 which may take the form of slits arranged in any desired pattern.

When air is applied to the diffuser body 18 from the lateral pipe 12, the gas pressure causes the membrane 20 to expand from the diffuser body 18, thus opening the perforations 24 and discharging the gas through the perforations into the liquid in the form of fine bubbles which are beneficial in that they efficiently transfer the gas to the liquid. When the gas pressure is relieved, the flexible membrane 20 collapses back onto the diffuser body 18 and thus closes the perforations 24 so that the liquid is unable to leak into the diffuser.

The present invention is directed specifically toward a multi-layer diffuser membrane 20 comprising at least two types of materials and being formed in an extrusion or coextrusion process. One embodiment of the present invention includes a two-layer membrane including a structural layer on the bottom or innermost layer and film or coating layer on the top or outer-most layer. Another embodiment includes a three-layer membrane having a structural layer, a first coating layer disposed on a first surface of the structural layer and a second coating layer disposed on a second surface of the structural layer.

Figure 2:
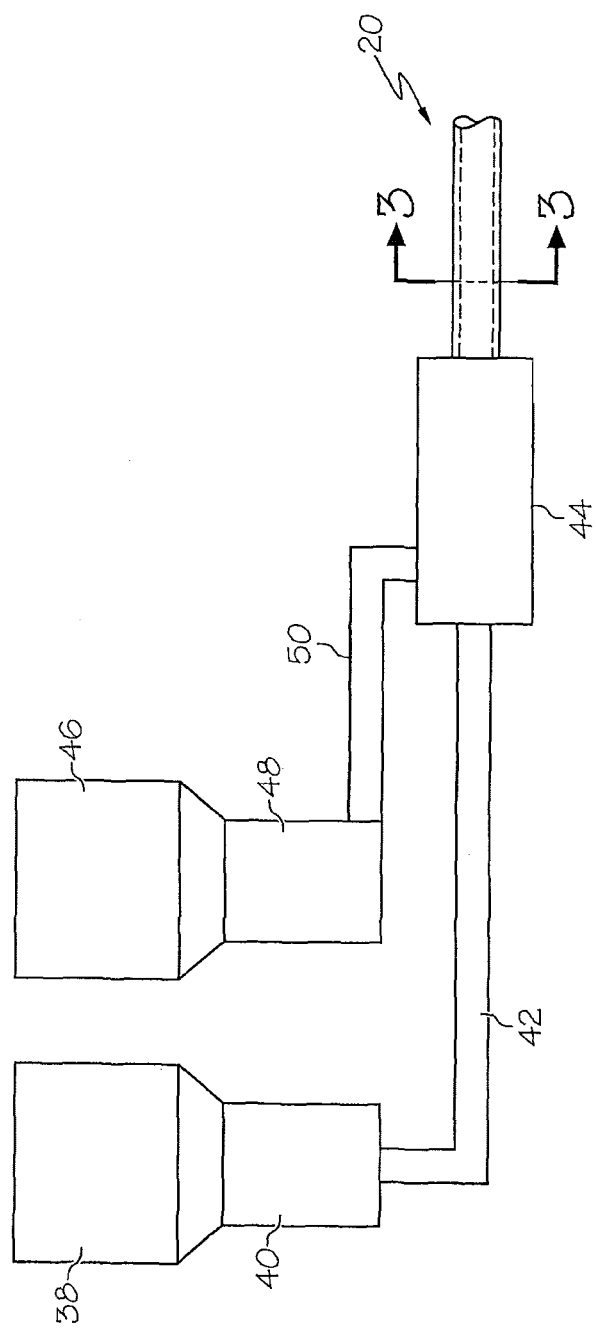
FIG. 2 is a schematic view of the manufacturing method in accordance with one embodiment of the present invention.

FIG. 2 illustrates a schematic drawing of a process for manufacturing an extruded diffuser membrane 20. In the process, the raw material for the base layer 26 can be contained within a hopper 38 or other storage receptacle. From there, the base material may proceed into a mixer 40 wherein it is mixed to provide a homogeneous mixture. The base material is then transferred through a feed tube 42 to an extrusion element, mandrel or die 44. The feed tube 42 may contain a screw-feed mechanism and may include heated walls to melt the raw base material to a desired extrusion temperature. Alternatively, heat may be applied in the mixer 40 thus creating a flowable homogeneous base mixture prior to being fed to the die 44 through the feed tube 42.

Similarly, the raw material for the film or coating layer 28 can be contained within a hopper 46 or other storage receptacle. From there, the coating material may proceed into a mixer 48 wherein it is mixed to provide a homogeneous mixture. The coating material is then transferred through a feed tube 50 to a die 44. The feed tube 50 may contain a screw-feed mechanism and may include heated walls to melt the raw coating material to a desired extrusion temperature. Alternatively, heat may be applied in the mixer 48 thus creating a flowable homogeneous coating mixture prior to being fed to the die 44 through the feed tube 50.

In one embodiment, the base layer 26 and coating layer 28 are formed substantially simultaneously with one another in a coextrusion process. The membrane 20 may be formed as an integral, one-piece component in a single operation. Accordingly, the coating 28 may be applied to the base layer 26 in a manner that optimizes the bonding between the two layers and provides the ability to control the thickness of the coating layer 28.

In another embodiment, the base layer 26 is formed initially and the coating layer 28 is subsequently formed thereover, albeit not in a simultaneous coextrusion process. In this embodiment, one or more of the base layer's surfaces 30 and 32 may be modified, cleaned and/or have a primer, adhesive or adhesive catalyst applied thereto, either an in-line or off-line process, in order to promote adhesion between the base layer 26 and the coating layers 28 and/or 36. The base layer 26 may then be conveyed by a conveying mechanism in order for the coating 28 to be extruded thereon.

In yet a another embodiment, a layer of primer or adhesive located between the base layer 26 and coating layer 28 is extruded over the base layer 26 and may be extruded substantially simultaneously with both the base layer 26 and coating layer 28.

The extruder die(s) 44 may be configured to create a tubular diffuser membrane 20, a generally flat diffuser membrane 20a or a membrane of any other suitable shape. The dies(s) 44 may be configured to create a base layer 26 or coating layer 28 that is relatively thick or thin as desired or specified. The ability to control the thickness of the coating layer 28 provides the ability to specifically manufacture a diffuser membrane 20 having a coating layer 28 that is thick enough to withstand erosion thereof.

Upon being found by the die, the membrane 20 or 20a may be cured or cooled depending upon the type of materials used. The membrane 20 or 20a may also be perforated to provide a plurality of perforations 24 extending through the membrane 20 or 20a, including the base layer 26 or 26a and coating layers 28, 28a and 36, through which a gas can be diffused.

Figure 3:
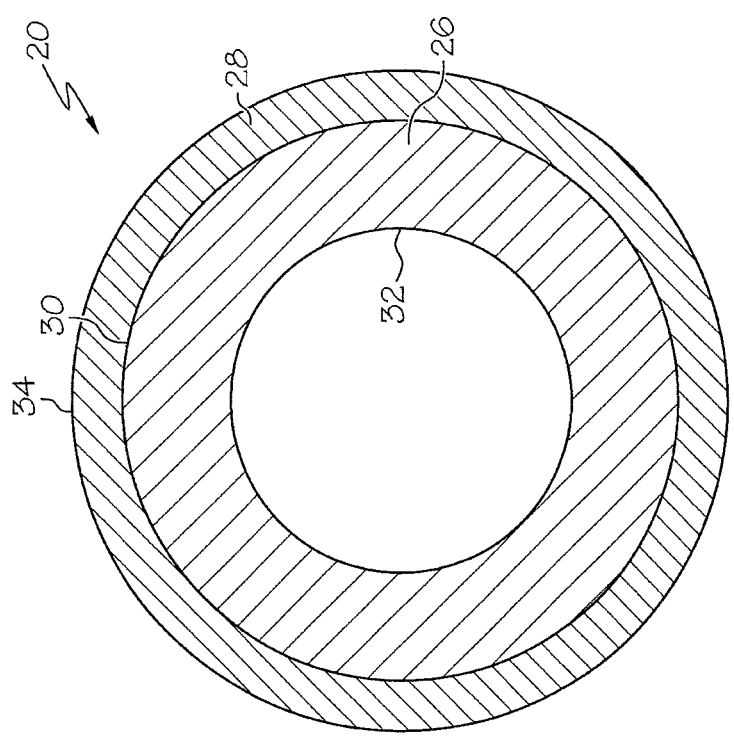
FIG. 3 is a cross-sectional view of the multiple layer extruded tubular diffuser membrane shown in FIG. 2 taken generally along line 3-3 in the direction of the arrows.

FIG. 3 depicts a two-layered membrane 20 resulting from the process described above. This particular embodiment has a tubular cross section and includes an inner base layer 26 and an outer coating layer 28. The base layer 26 has an outer or first surface 30 and an inner or second surface 32. As shown, the coating 28 is disposed over the base layer's first surface 30. The base layer 26 and coating 28 may be each be of any suitable thickness.

Figure 4:
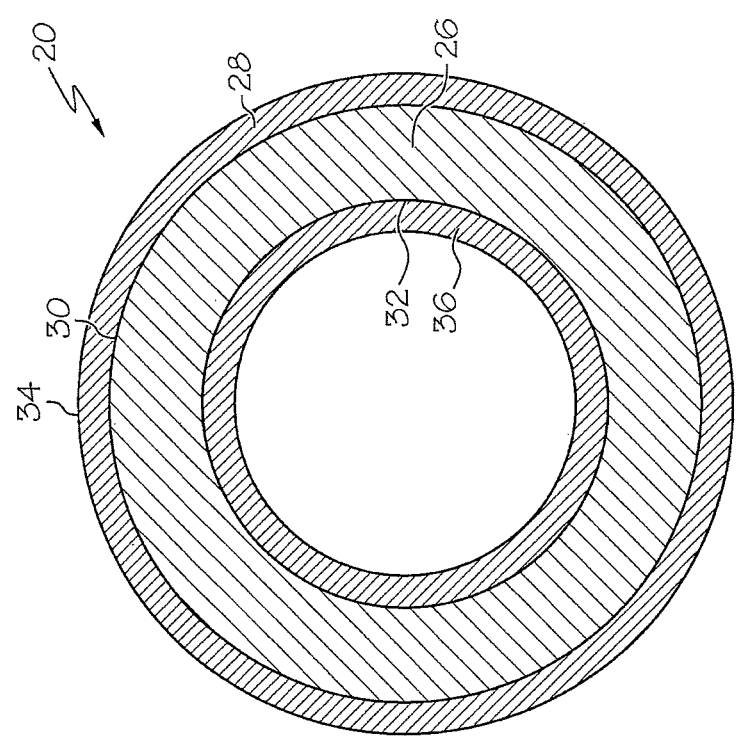
FIG. 4 is a cross-sectional view of the multiple layer extruded tubular diffuser membrane constructed in accordance with another embodiment of the present invention.

FIG. 4 illustrates a three-layered membrane 20 having a tubular cross-section that includes a base layer 26, an outer coating layer 28 and an inner coating layer 36. The outer coating 28 is disposed over the base layer's first surface 30 and the inner coating 36 is provided to the interior of the base layer's second surface 32. In such an embodiment, the number of hoppers, mixers and feed tubes shown in FIG. 2 can be increased in order to accommodate the third layer. Further, it will be understood that embodiments having four or more layers are also within the scope of this invention.

Figure 5:
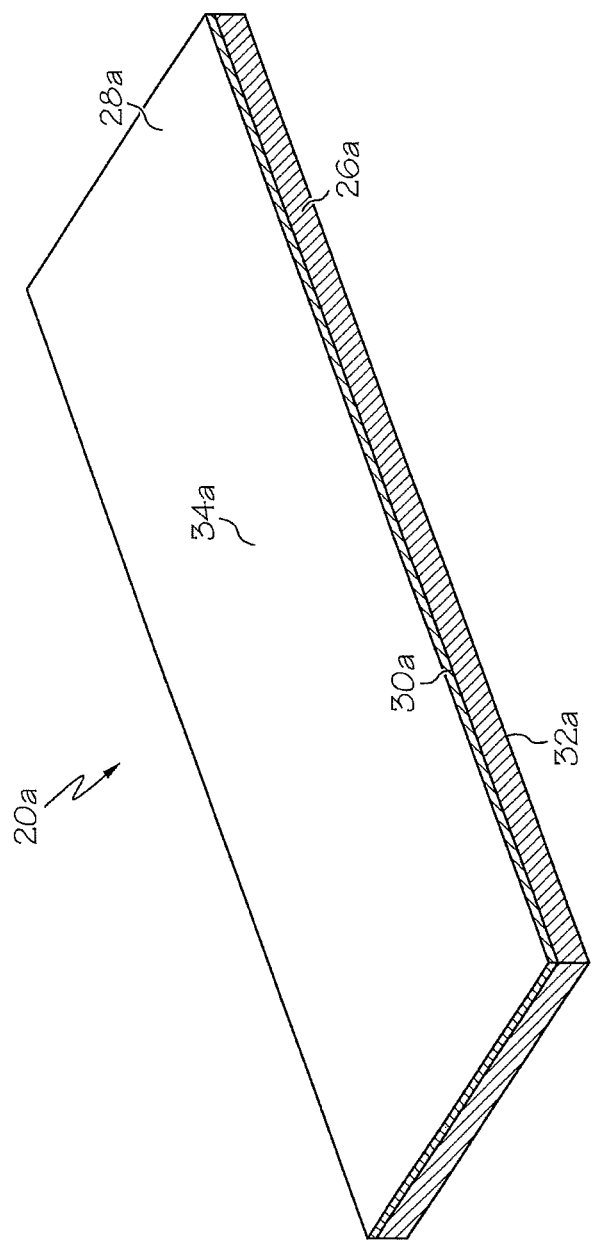
FIG. 5 is a perspective view of a multiple layer extruded diffuser membrane in accordance with one embodiment of the present invention.

FIG. 5 shows a generally flat membrane 20a as may be associated with a disc diffuser or a panel diffuser. The two-layered membrane 20a is shown as having a base layer 26 and a coating layer 28a. The base layer 26a has an outer or first surface 30a and an inner or second surface 32a. As shown, the coating 28a is disposed over the base layer's first surface 30a. It will be understood that a second coating (not shown) may be extruded over the base layer's second surface 32a.

In any of the embodiments that are within the scope of the present invention, the material forming the base layer 26 and 26a may comprise rubber, polyurethane, ethylene propylene diene monomer (EPDM), nitrile rubber, nitrile butadiene rubber, thermoset material, thermoplastic material, thermoplastic vulcanizate (TPV), thermoplastic rubber (TPR), natural or artificial woven material, polyvinyl chloride (PVC), polytetrafluoroethylene (PTFE), any product from the urethane-based family or urethane family of thermoplastics, a cross link polyurethane material, any polymer suitable for bonding with polyurethane or PTFE, any other suitable material now known or hereafter developed or any combination thereof.

The material forming the coating layer 28, 28a and 36 may comprise polyurethane, PTFE, silicone, fluorinated ethylene propylene, fluorocarbon elastomer, fluoroelastomer polymer, ceramic, thermoplastic, thermoset material, a suitable fluorine-containing material, a cross link polyurethane material any polymer that bonds with polyurethane or PTFE, any other suitable non-stick or low friction material, any other suitable material now known or hereafter developed or any combination thereof. One embodiment includes a mixture of polyurethane and PTFE wherein polyurethane comprises a range of 1%-99% of the total mixture by weight and the PTFE comprises 99% to 1% of the total mixture by weight.

An adhesive catalyst may also be applied to the mixture making up the base layer 26 or 26a and/or coating layers 28, 28a and 36 for creating a strong adhesive, chemical and molecular bond. The adhesive catalyst can be applied in order to increase the strength of the bond between the base layer 26 or 26a and coating layer(s) 28, 28a and 36 such that the bond is able to withstand the forces applied to the membrane 20 and 20a during normal service.

The coating layers 28, 28a and 36 (if provided) prevent contaminants in the liquid from becoming deposited on and accumulating on the membrane 20 or 20a, as the coating layers 28, 28a and 36 provide a slick or nonstick surface that resists adhesion of foreign materials to an outer surface 34 or 34a of the membrane 20 or 20a. The coatings 28, 28a and 36 are also beneficial in that they resist the growth of biological materials that could otherwise build up on the membrane 20 or 20a. The coatings 28, 28a and 36 are also resistant to chemicals and other solvents that can chemically attack and degrade or destroy the membrane 28, 28a and 36.

Accordingly, the membrane 20 and 20a of the present invention takes advantage of the beneficial attributes of the base layer 26 or 26a (physical and structure properties and flexibility) along with the protective qualities provided by the coating layers 26, 26a and 36.

One embodiment of the present invention includes a coating layer 28 comprising polyurethane and PTFE that is extruded substantially continuously and simultaneously with a base layer 26 comprising polyurethane. The polyurethane of the base layer 26 bonds or adheres with the polyurethane of the coating layer 28 to form a polymer bond between the two layers. In such a case, no adhesive or independent materials need be applied between the two layers 26 and 28 in order for the two layers to form an adequate bond. In the process of constructing this embodiment of the membrane 20, PTFE is mixed with polyurethane to form the material from which the coating layer 28 is extruded. The two extrusions of the base layer 26 and the coating layer 28 flow out of the extruder die 44 concentrically at the same time and are joined immediately upon exiting the die 44. The layers 26 and 28 are cooled, cured and bonded together permanently during this manufacturing process.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A coextruded multi-layered flexible diffuser membrane structure for applying gas to a liquid comprising:
   an extruded base layer formed from a first material, said base layer having first and second opposing surfaces;
   an extruded first coating layer formed from a second material, said first coating layer being disposed on said first surface of said base layer and being simultaneously coextruded therewith; and
   a plurality of perforations extending through said base layer and coating layer through which gas can be diffused into said liquid, wherein said perforations are slits arranged in a pattern and are adapted for discharging said gas through said membrane in the form of fine bubbles;
   wherein said perforations are adapted to open when said gas pressure is applied against said membrane and close when gas pressure against said membrane is relieved, wherein said liquid is unable to leak through said membrane when said perforations are closed.

2. The diffuser membrane of claim 1 further comprising an extruded second coating layer formed from a third material, said second coating layer being disposed on said second surface of said base layer.

3. The diffuser membrane of claim 2, wherein said membrane is selected from a group consisting of a tubular-shaped membrane, a disc-shaped membrane and a panel-shaped membrane.

4. The diffuser membrane of claim 1, wherein said first material is selected from the group consisting of rubber, polyurethane, EPDM, thermoplastic vulcanizate, PVC, and PTFE.

5. The diffuser membrane of claim 4, wherein said second material is selected from the group consisting of polyurethane, PTFE, silicone, and fluorinated ethylene propylene.

6. The diffuser membrane of claim 1, wherein at least one of said first material and said second material comprises an adhesive catalyst.

7. The diffuser membrane of claim 1, wherein a polymer bond is formed between said base layer and said first coating layer.

8. The diffuser membrane of claim 1, wherein said membrane is adapted to expand upon an application of pressurized gas thereby opening said perforations, and wherein said membrane is adapted to collapse upon relief of said pressurized gas thereby closing said perforations so that said liquid is unable to leak through said membrane.

9. The diffuser membrane of claim 1, wherein said membrane is configured for being operably connected to an aeration system.

10. The diffuser membrane of claim 9, wherein said membrane is configured for being operably connected to a diffuser body of said aeration system.

11. The diffuser membrane of claim 9, wherein said aeration system is configured for aerating said liquid by diffusing said gas into said liquid.

12. A coextruded multi-layered flexible diffuser membrane structure for applying gas to a liquid comprising:
   an extruded base layer formed from a first material, said base layer having first and second opposing surfaces;
   an extruded first coating layer formed from a second material, said first coating layer being disposed on said first surface of said base layer and being simultaneously coextruded therewith; and
   a plurality of perforations extending through said base layer and coating layer through which gas can be diffused into said liquid, wherein said perforations are slits arranged in a pattern;
   wherein said first material comprises polyurethane and said second material comprises polytetrafluoroethylene.

13. A coextruded multi-layered flexible diffuser membrane for applying gas to a liquid constructed by a process comprising the steps of:
   extruding a base layer from a first material, said base layer including first and second opposing surfaces;
   extruding a first coating layer from a second material over said first surface of said base layer; and
   perforating said membrane to form a plurality of perforations extending through said membrane, including extending through said base layer and said first coating layer through which gas can be diffused into said liquid;

wherein said perforations are slits arranged in a pattern and are adapted for discharging said gas through said membrane in the form of fine bubbles;

wherein said base layer and said first coating layer are extruded simultaneously in a coextrusion process;

wherein said perforations are adapted to open when gas pressure is applied against said membrane and close when gas pressure against said membrane is relieved, wherein said liquid is unable to leak through said membrane when said perforations are closed.

* * * * *